US010922947B2

(12) United States Patent
Watanabe (10) Patent No.: US 10,922,947 B2
(45) Date of Patent: Feb. 16, 2021

(54) RESCUE SIGNAL TRANSMISSION SYSTEM (71) Applicant: SUZUKI MOTOR CORPORATION, Hamamatsu (JP)

(72) Inventor: Koichiro Watanabe, Hamamatsu (JP)

(73) Assignee: SUZUKI MOTOR CORPORATION ( * ) Notice: Subject to any disclaimer, the term of this patent is extended or adjusted under 35 U.S.C. 154(b) by 0 days.

(21) Appl. No.: 16/528,928

(22) Filed: Aug. 1, 2019

(65) Prior Publication Data
US 2020/0043315 A1    Feb. 6, 2020

(30) Foreign Application Priority Data

Aug. 2, 2018   (JP) .................. 2018-145930

(51) Int. Cl.
G08B 21/08     (2006.01)
B63C 9/00      (2006.01)
B60K 28/04     (2006.01)
H01H 3/02      (2006.01)

(52) U.S. Cl.
CPC ............ *G08B 21/088* (2013.01); *B60K 28/04* (2013.01); *B63C 9/0005* (2013.01); *H01H 3/0226* (2013.01); *H01H 2300/026* (2013.01)

(58) Field of Classification Search
None
See application file for complete search history.

(56) References Cited

U.S. PATENT DOCUMENTS

| 5,463,598 | A | * | 10/1995 | Holland | G01S 5/183 367/131 |
| 5,486,814 | A | * | 1/1996 | Quinones | G08B 21/088 340/569 |
| 5,710,989 | A | * | 1/1998 | Flood | B63C 9/0005 200/61.05 |
| 5,838,227 | A | * | 11/1998 | Murray | B60R 25/04 340/539.21 |
| 6,222,484 | B1 | * | 4/2001 | Seiple | B63C 9/0005 342/357.55 |
| 7,259,682 | B2 | * | 8/2007 | Vannerus | G08B 21/0247 340/539.11 |

(Continued)

FOREIGN PATENT DOCUMENTS

JP    2005-219720 A       8/2005
JP    2005219720 A    *  8/2005
JP    2015-67263 A        4/2015

*Primary Examiner* — Steven Lim
*Assistant Examiner* — Muhammad Adnan
(74) *Attorney, Agent, or Firm* — Troutman Pepper Hamilton Sanders LLP (57) ABSTRACT A ship includes a controller that performs wireless communications with a portable machine possessed by a passenger and a lanyard stop switch. When a lanyard code coupled to the passenger is pulled out, the lanyard stop switch operates to stop an engine of an outboard motor and stop the ship. When the controller detects that the lanyard stop switch operates, that is, detects a possibility that the passenger has fallen overboard, the controller starts wireless communications with the portable machine. The controller determines whether or not a rescue signal needs to be transmitted in accordance with conditions regarding a power density and a frequency of a radio wave of the wireless communications as predetermined conditions for estimating a situation of the passenger.

4 Claims, 5 Drawing Sheets

(56) References Cited

U.S. PATENT DOCUMENTS

| | | | |
|---|---|---|---|
| 7,492,251 B1* | 2/2009 | Katz | B63C 9/0005 340/539.11 |
| 9,102,388 B2* | 8/2015 | Lee | G01S 19/17 |
| 9,550,418 B1* | 1/2017 | Logan | H04W 4/80 |
| 9,799,194 B2* | 10/2017 | Wang | G08B 21/0446 |
| 9,953,507 B1* | 4/2018 | Smith | G08B 21/043 |
| 10,088,574 B2* | 10/2018 | Murphy | B64D 45/0059 |
| 10,298,339 B2* | 5/2019 | Snyder | H04B 17/318 |
| 10,354,510 B2* | 7/2019 | Hung | G08B 25/10 |
| 10,692,348 B2* | 6/2020 | Ruchti | G08B 21/0291 |
| 2002/0052159 A1* | 5/2002 | Eguchi | B63C 9/0005 441/80 |
| 2004/0048598 A1* | 3/2004 | Gagnon | G01C 21/20 455/404.2 |
| 2004/0121782 A1* | 6/2004 | Tester | H04W 84/005 455/456.1 |
| 2004/0222891 A1* | 11/2004 | Ehlers | G08B 21/0211 340/573.1 |
| 2008/0062816 A1* | 3/2008 | Leal | G01S 5/28 367/93 |
| 2008/0174484 A1* | 7/2008 | Katz | G08B 21/088 342/357.31 |
| 2008/0256687 A1* | 10/2008 | Spencer | A42B 3/0466 2/425 |
| 2009/0121931 A1* | 5/2009 | Katz | G01S 5/0231 342/357.55 |
| 2009/0219160 A1* | 9/2009 | Shervey | B63C 9/0005 340/573.6 |
| 2014/0292543 A1* | 10/2014 | Lahyani | B63B 45/00 340/984 |
| 2015/0094886 A1* | 4/2015 | Anma | B63C 9/0005 701/21 |
| 2018/0335780 A1* | 11/2018 | Stevens | G05D 1/0088 |
| 2020/0031448 A1* | 1/2020 | Gonring | B63C 9/0005 |
| 2020/0141965 A1* | 5/2020 | Sarangpani | G01S 15/582 |

* cited by examiner

RESCUE SIGNAL TRANSMISSION SYSTEM

CROSS-REFERENCE TO RELATED APPLICATIONS

This application is based upon and claims the benefit of priority of the prior Japanese Patent Application No. 2018-145930, filed on Aug. 2, 2018, the entire contents of which are incorporated herein by reference.

FIELD OF THE INVENTION

The present invention relates to a rescue signal transmission system in a ship.

BACKGROUND

Some ships include lanyard stop switches. The lanyard stop switch couples to a passenger via a lanyard code. When the lanyard code is pulled out caused by the passenger having fallen overboard and the like, the lanyard stop switch operates to stop an engine of an outboard motor and stop the ship. This allows preventing the ship from advancing while the person who has fallen overboard is left.

As a technique used for rescue assistance of the person who has fallen overboard, Japanese Laid-open Patent Publication No. 2015-67263 discloses the following configuration. When an operation of a lanyard switch stops an engine, a control device determines that a ship operator needs to be rescued and instructs a mobile terminal to transmit a rescue signal.

Additionally, Japanese Laid-open Patent Publication No. 2005-219720 discloses a configuration that detects a passenger in a ship has fallen overboard based on a failure of reception of a predetermined signal from a wireless transmitter that should be carried by the passenger. For example, when all members have fallen overboard or a captain has fallen overboard, the configuration automatically transmits a rescue signal from the ship.

However, as in Japanese Laid-open Patent Publication No. 2015-67263, the transmission of the rescue signal by the operation of the lanyard stop switch possibly increases transmission of unnecessary rescue signals. For example, when a passenger has fallen overboard but can return to the ship for himself/herself or with help from a person riding on the identical ship and also when the lanyard code has been pulled out due to carelessness and turnover on the ship although the passenger does not fall overboard, the rescue signal is transmitted.

Further, while Japanese Laid-open Patent Publication No. 2005-219720 transmits the rescue signal from aspects whether or not a passenger other than the person who has fallen overboard rides on the ship and whether or not the person who has fallen overboard is a specific person, regardless of the number of persons who have fallen overboard and the person who has fallen overboard being the specific person or not, depending on a situation of the person who has fallen overboard, the rescue signal needs to be promptly transmitted.

SUMMARY OF THE INVENTION

The present invention has been made in consideration of such actual conditions, and an object of the present invention is to ensure reducing transmission of unnecessary rescue signals and promptly transmitting the rescue signal when a passenger has fallen overboard and rescue is expected to be required.

A rescue signal transmission system according to the present invention is a rescue signal transmission system in a ship that includes a detecting device, a communication device, a portable machine, and a control device. The detecting device is configured to detect a possibility that a passenger has fallen overboard. The communication device is mounted to the ship. The portable machine is possessed by the passenger. The portable machine is configured to communicate with the communication device. The control device is configured such that when the detecting device detects the possibility that the passenger has fallen overboard, the control device determines whether or not a rescue signal needs to be transmitted in accordance with a predetermined condition for estimating a situation of the passenger. The control device is configured such that when the transmission of the rescue signal is determined to be necessary, the control device performs control to transmit the rescue signal.

DETAILED DESCRIPTION

A rescue signal transmission system according to one embodiment of the present invention is a rescue signal transmission system in a ship that includes a detecting device, a communication device, a portable machine, and a control device. The detecting device is configured to detect a possibility that a passenger has fallen overboard. The communication device is mounted to the ship. The portable machine is possessed by the passenger. The portable machine is configured to communicate with the communication device. The control device is configured such that when the detecting device detects the possibility that the passenger has fallen overboard, the control device determines whether or not a rescue signal needs to be transmitted in accordance with a predetermined condition for estimating a situation of the passenger. The control device is configured such that when the transmission of the rescue signal is determined to be necessary, the control device performs control to transmit the rescue signal.

As described above, in addition to the detection that there is a possibility that the passenger has fallen overboard, whether or not the rescue signal needs to be transmitted is determined in accordance with the predetermined condition for estimating the situation of the passenger. This allows reducing the transmission of unnecessary rescue signal and promptly transmitting the rescue signal when the passenger has fallen overboard and therefore the rescue is expected to be required.

Embodiments

The following describes preferred embodiments of the present invention with reference to the attached drawings.

Figure 1:
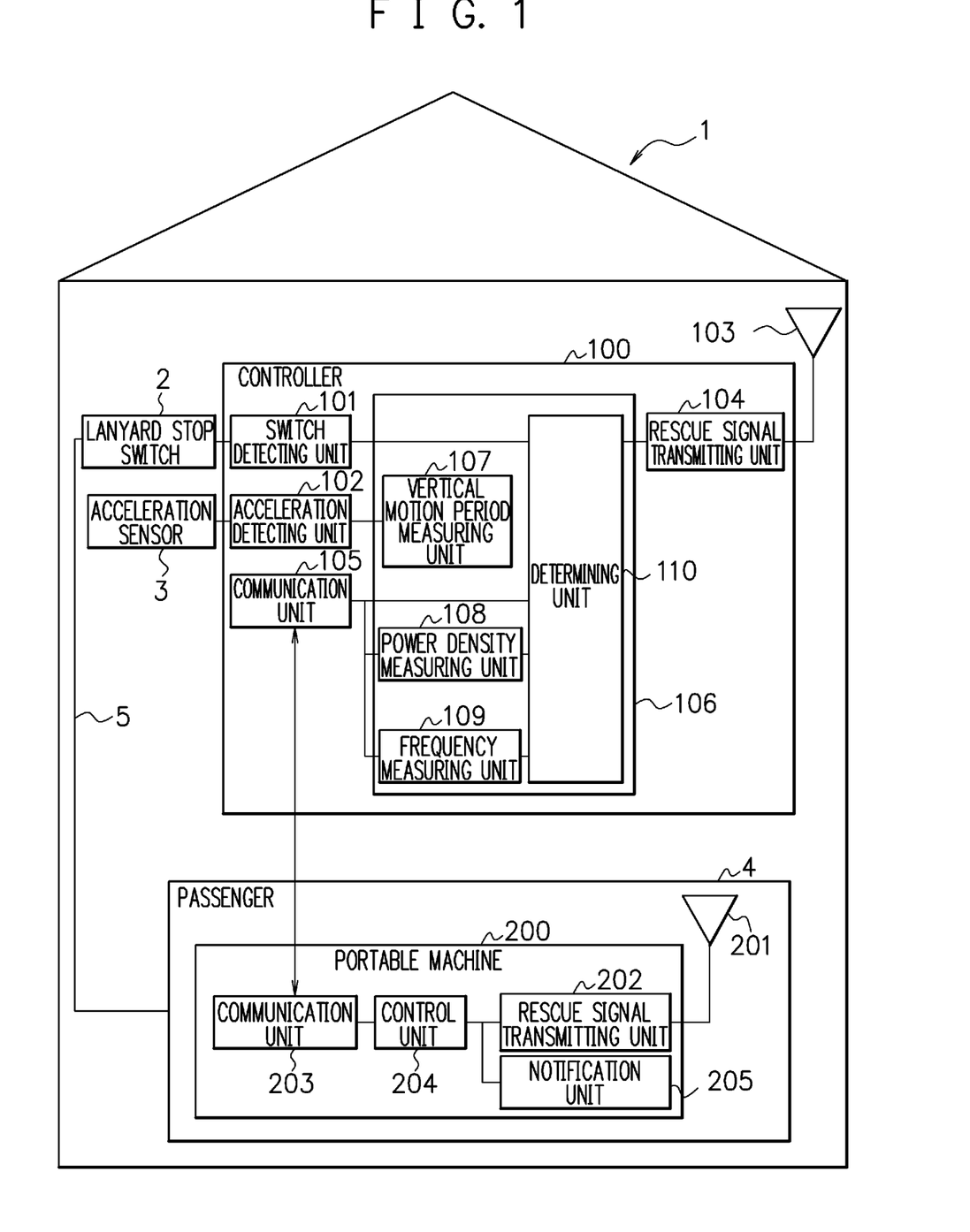
FIG. 1 is a drawing illustrating an outline of an overall configuration including a rescue signal transmission system according to an embodiment.

FIG. 1 is a drawing illustrating an outline of an overall configuration including the rescue signal transmission system according to the embodiment.

A ship 1 includes a controller 100, a lanyard stop switch 2, and an acceleration sensor 3.

A passenger 4 who rides on the ship 1 couples to the lanyard stop switch 2 via a lanyard code 5. When the lanyard code 5 is pulled out, the lanyard stop switch 2 stops a driving source of an outboard motor (an engine and an electric motor as an internal combustion engine) (not illustrated) to stop the ship 1. The operation of the lanyard stop switch 2, that is, pulling out the lanyard code 5 means that the passenger 4 possibly has fallen overboard. However, there may be a case where, although the passenger 4 has not fallen overboard, the lanyard code 5 has been pulled out due to, for example, carelessness and turnover on the ship 1. While FIG. 1 illustrates only one passenger 4 (for example, a ship operator), all members (ship operator and persons riding on the identical ship) may couple to the lanyard stop switch 2 via the lanyard code 5.

The controller 100 includes a switch detecting unit 101, an acceleration detecting unit 102, a transmitter 103, a rescue signal transmitting unit 104, a communication unit 105, and a control unit 106.

The switch detecting unit 101 detects a switch state of the lanyard stop switch 2. The acceleration detecting unit 102 detects an acceleration detected by the acceleration sensor 3. The rescue signal transmitting unit 104 transmits a rescue signal to a ship sailing nearby, Japan Coast Guard, and the like via the transmitter 103. The communication unit 105 wirelessly communicates with a portable machine 200. The control unit 106 is in charge of the overall control.

The control unit 106 includes a vertical motion period measuring unit 107, a power density measuring unit 108, a frequency measuring unit 109, and a determining unit 110. Although details of processes performed by the respective units 107 to 110 will be described later, when the control unit 106 detects that the lanyard stop switch 2 has operated, that is, detects that the passenger 4 has possibly fallen overboard, the control unit 106 determines whether or not the rescue signal needs to be transmitted in accordance with a predetermined condition for estimating the situation of the passenger. When the control unit 106 determines that the rescue signal needs to be transmitted, the control unit 106 issues an instruction to the rescue signal transmitting unit 104 to perform control to transmit the rescue signal.

The passenger 4 possesses the portable machine 200. For example, a Frequency Operated Button (FOB) key is equivalent to the portable machine 200.

The portable machine 200 includes a transmitter 201, a rescue signal transmitting unit 202, a communication unit 203, a control unit 204, and a notification unit 205.

The rescue signal transmitting unit 202 transmits the rescue signal to the ship sailing nearby, Japan Coast Guard, and the like via the transmitter 201. The communication unit 203 performs wireless communications with the controller 100. The control unit 204 is in charge of the overall control. The notification unit 205 is configured of, for example, a Light Emitting Diode (LED). For example, lighting the LED notifies that the rescue signal has already been transmitted. The notification unit 205 may be configured of, for example, a monitor, a sound output unit, a vibration generator, and the like.

In a case where the plurality of passengers 4 are present, all members (ship operator, persons riding on the identical ship) may possess the portable machines 200. For example, when the portable machine 200 is mounted to a wrist, an ankle, and the like of the passenger 4 or the portable machine 200 can be equipped with a life jacket worn by the passenger 4, the portable machine 200 can be always worn by the passenger 4. The portable machine 200 is configured to have water resistance and impact resistance so as not to be broken due to just turnover of the passenger 4.

The following describes processes of the rescue signal transmission system according to the embodiment with reference to FIGS. 2 to 6.

Figure 2:
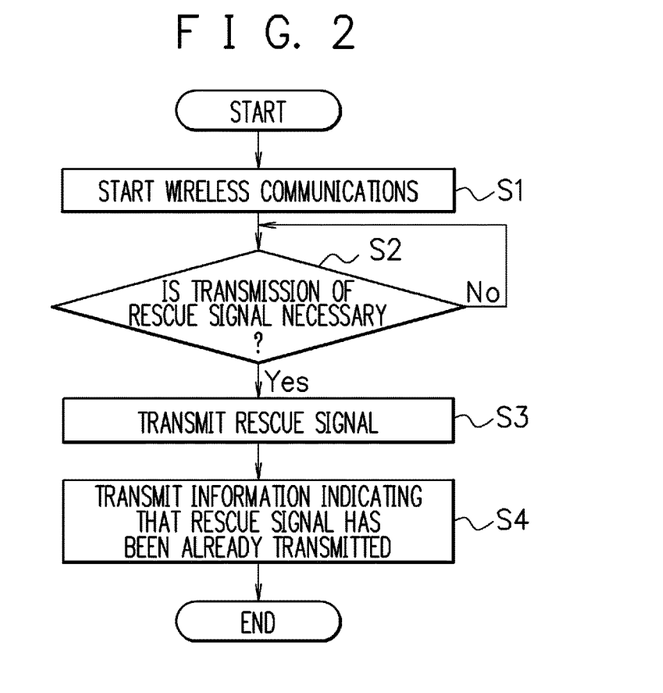
FIG. 2 is a flowchart depicting processes of the rescue signal transmission system according to the embodiment.

FIG. 2 is a flowchart depicting the processes of the rescue signal transmission system according to the embodiment. When the controller 100 detects the operation of the lanyard stop switch 2 via the switch detecting unit 101, that is, detects a possibility that the passenger 4 has fallen overboard, the controller 100 starts the processes of the flowchart of FIG. 2.

At Step S1, the controller 100 starts wireless communications with the portable machine 200. For example, the control unit 106 in the controller 100 transmits a communication start signal to the portable machine 200 via the communication unit 105. By the detection of the communication start signal by the portable machine 200 and establishment of coupling through a predetermined process, the controller 100 starts wireless communications with the portable machine 200. In a case where the plurality of passengers 4 each possess the portable machine 200, the controller 100 starts wireless communications with the plurality of portable machines 200.

The controller 100 may always perform wireless communications with the portable machine 200. Meanwhile, like this embodiment, starting wireless communications when the operation of the lanyard stop switch 2 is detected allows reducing power consumption and also allows the use of a battery of the portable machine 200 only in case of emergency.

At Step S2, the control unit 106 in the controller 100 determines whether or not the rescue signal needs to be transmitted in accordance with a predetermined condition estimating the situation of the passenger. Although details of this determination process will be described later, this embodiment employs a condition A to a condition E as the predetermined conditions and determines whether or not the rescue signal needs to be transmitted in accordance with the conditions. When the transmission of the rescue signal is determined to be necessary, the process proceeds to Step S3, and when not, the determination process of Step S2 is repeated.

At Step S3, the control unit 106 in the controller 100 issues an instruction to the rescue signal transmitting unit 104 and performs control to transmit the rescue signal. The rescue signal transmitting unit 104 transmits the rescue signal to the ship sailing nearby, Japan Coast Guard, and the like via the transmitter 103.

At Step S4, the control unit 106 in the controller 100 transmits information indicating that the rescue signal has been already transmitted to the portable machine 200 that has started wireless communications at Step S1 via the communication unit 105. When the control unit 204 in the portable machine 200 receives the information indicating that the rescue signal has already been transmitted from the controller 100 via the communication unit 203, the control unit 204 notifies the passenger 4 of the fact using the notification unit 205. This allows the passenger 4 possessing the portable machine 200 to know that the rescue signal has already been transmitted, thereby ensuring feeling a sense of security.

When the portable machine 200 receives the information indicating that the rescue signal has already been transmitted from the controller 100, the rescue signal may be transmitted via the transmitter 201 under control by the control unit 204. Thus, not only the controller 100 of the ship 1 but also the portable machine 200 can transmit the rescue signal. This allows increasing a possibility that the passenger 4 who has fallen overboard, is away from the ship 1, and drifts is found. Further, a configuration in which the passenger 4 himself/herself performs a manual operation on the portable machine 200 to ensure transmitting the rescue signal via the transmitter 201 may be employed.

Next, the following describes details of the determination process at Step S2. The determination process determines whether the rescue signal needs to be transmitted or not in accordance with the condition A to the condition E.

Figure 3:
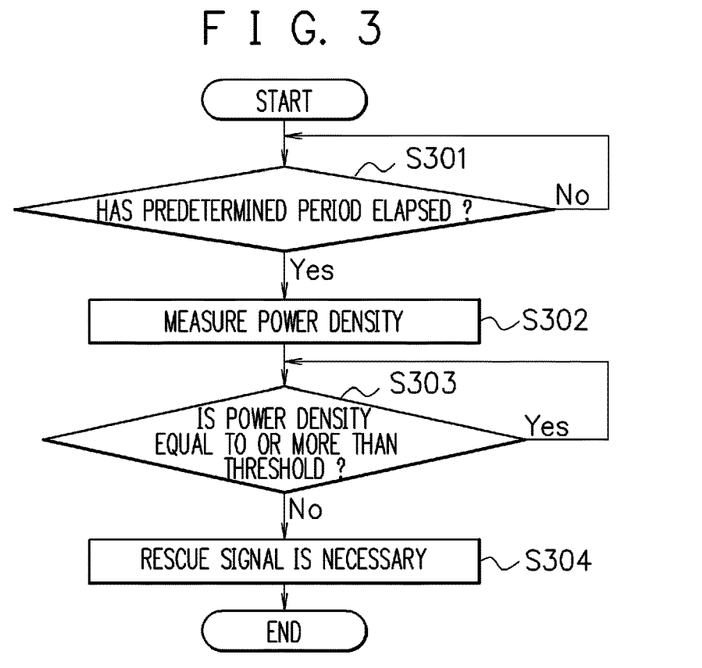
FIG. 3 is a flowchart depicting details of a determination process for a condition A.

FIG. 3 is a flowchart depicting details of the determination process for the condition A. In the flowchart of FIG. 3, it is determined whether or not the rescue signal needs to be transmitted in accordance with a condition regarding power density of a radio wave of wireless communications performed between the controller 100 and the portable machine 200.

At Step S301, after stopping the driving source by the lanyard stop switch 2, the control unit 106 stands by until a predetermined period elapses. The predetermined period is set as a period until the ship 1 stops (the ship 1 actually stops) after the stop of the driving source. In the flowchart of FIG. 3, a positional relationship between the ship 1 and the passenger 4 who has possibly fallen overboard is determined and waits for the ship 1 to stop.

At Step S302, the power density measuring unit 108 in the control unit 106 measures the power density of the radio wave of wireless communications between the controller 100 and the portable machine 200.

At Step S303, the determining unit 110 in the control unit 106 determines whether or not the power density measured at Step S302 is equal to or more than a preset threshold. In the case of the power density being equal to or more than the threshold, the transmission of the rescue signal is determined to be unnecessary currently and the process returns to Step S302 to measure the power density again. On the other hand, when the power density falls below the threshold, the process proceeds to Step S304 and the transmission of the rescue signal is determined to be necessary.

Defining an electric power on the transmission side as P[W], the power density on the reception side as $P_0$ [W/m$^2$], and a distance between the transmission side and the reception side as D [m], it is known that $P_0 = P/4\pi D^2$ can be expressed and the power density is inversely proportional to the square of the distance D. When the power density measured at Step S302 is equal to or more than the threshold, since the distance between the ship 1 (controller 100) and the passenger 4 (portable machine 200) is short, there is a high possibility that the passenger 4 does not fall overboard or has fallen overboard but is close to the ship 1 and therefore the passenger 4 can return to the ship 1 for himself/herself or with help from a person riding on the identical ship. Therefore, the transmission of the rescue signal is determined to be unnecessary and the process returns to Step S302. On the other hand, at Step S302, when the measured power density falls below the threshold, the distance between the ship 1 (controller 100) and the passenger 4 (portable machine 200) is long, and therefore the passenger 4 possibly has fallen overboard and is away from the ship 1. Accordingly, the process proceeds to Step S304 and the transmission of the rescue signal is determined to be necessary.

Figure 4:
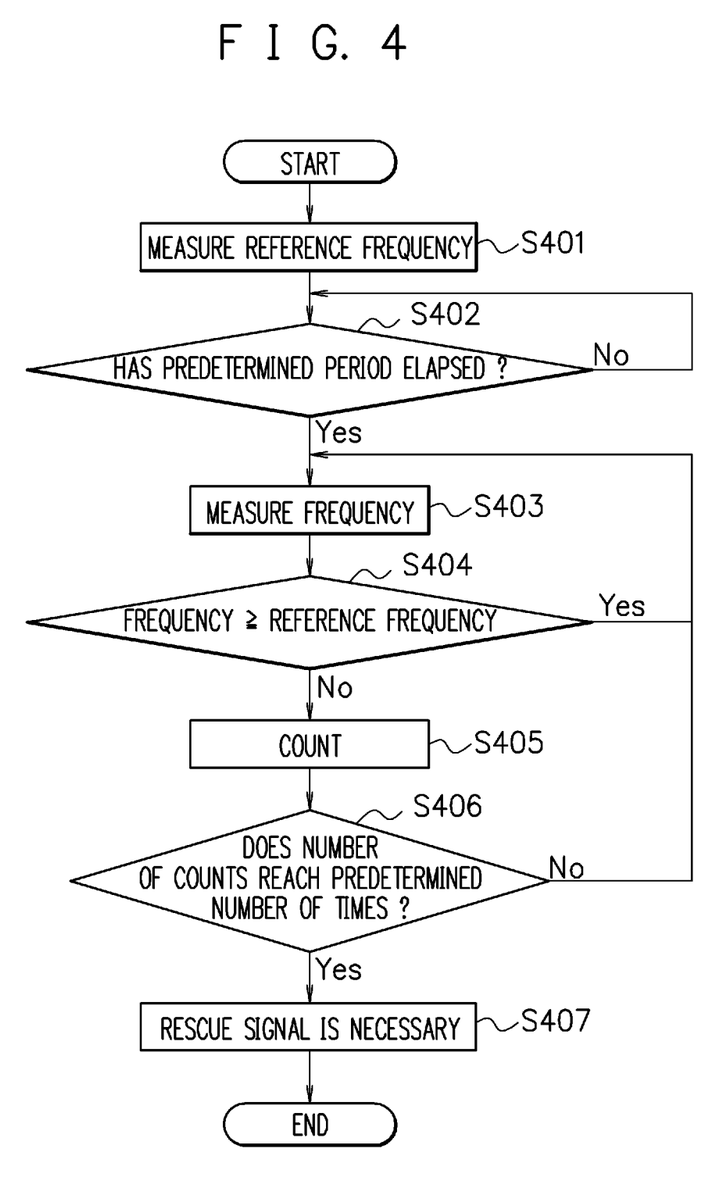
FIG. 4 is a flowchart depicting details of a determination process for a condition B.

FIG. 4 is a flowchart depicting details of the determination process for the condition B. In the flowchart of FIG. 4, it is determined whether or not the rescue signal needs to be transmitted in accordance with a condition regarding a change in frequency of the radio wave of wireless communications performed between the controller 100 and the portable machine 200.

At Step S401, the frequency measuring unit 109 in the control unit 106 measures the frequency of the radio wave of wireless communications between the controller 100 and the portable machine 200 and holds the frequency as a reference frequency.

At Step S402, after stopping the driving source by the lanyard stop switch 2, the control unit 106 stands by until a predetermined period elapses. This process is similar to the process of Step S301 of FIG. 3 that waits the ship 1 to stop.

At Step S403, the frequency measuring unit 109 in the control unit 106 measures the frequency of the radio wave of wireless communications between the controller 100 and the portable machine 200.

At Step S404, the determining unit 110 in the control unit 106 determines whether or not the frequency measured at Step S403 is equal to or more than the reference frequency measured at Step S401. When the frequency is equal to or more than the reference frequency, the process returns to Step S403 to measure the frequency again. On the other hand, when the frequency falls below the reference frequency, the process proceeds to Step S405.

Here, the reference frequency measured at Step S401 is a frequency immediately after the lanyard stop switch 2 operates, and it can be said that the reference frequency is a frequency in a state where a difference in speed does not occur between the ship 1 (controller 100) and the passenger 4 (portable machine 200).

The frequency measured at Step S403 is a frequency in a state where the ship 1 stops. When the passenger 4 who has fallen overboard approaches or is away from the stopped ship 1, the frequency of the radio wave of wireless communications between the controller 100 and the portable machine 200 changes because of the Doppler effect. When the passenger 4 who has fallen overboard is swept away in a direction away from the ship 1, the frequency of the radio wave of wireless communications between the controller 100 and the portable machine 200 is lowered because of the Doppler effect. Accordingly, when the frequency falls below the reference frequency, it is determined that the rescue signal is possibly necessary and the process proceeds to Step S405.

At Step S405, the control unit 106 repeats counting, and at Step S406, the control unit 106 determines whether or not the number of counts reaches a preset predetermined number of times. When the number of counts does not reach the predetermined number of counts, the process returns to Step S403 and the frequency is measured again. On the other hand, when the number of counts reaches the predetermined number of times, the process proceeds to Step S407 and the transmission of the rescue signal is determined to be necessary.

The passenger 4 who has fallen overboard frequently approaches and is away from the ship 1 by an influence of wave and wind. When overlooked, even when the passenger 4 who has fallen overboard is swept away in the direction away from the ship 1, the passenger 4 repeatedly approaches and is away from the ship 1 frequently. In this embodiment, when the frequency falls below the reference frequency by the predetermined number of times, it is determined that the passenger 4 has fallen overboard and is swept away in the direction away from the ship 1 and therefore the rescue signal needs to be transmitted. For example, when the transmission of the rescue signal is determined to be necessary because of, for example, the frequency falling below the reference frequency even once, this possibly results in the transmission of the unnecessary rescue signal. For example, when the passenger 4 who has fallen overboard repeatedly approaches and is away from the ship 1 but almost remains on the spot, although there is a high possibility that the passenger 4 can return to the ship 1 for himself/herself or with help from a person riding on the identical ship, the rescue signal is transmitted in that case as well.

While Step S401 gives the example where the frequency immediately after the lanyard stop switch 2 operates is measured and set as the reference frequency, in a case where a frequency of a radio wave of wireless communications performed in a state where the controller 100 and the portable machine 200 do not relatively move is already known, the frequency may be set as the reference frequency and preliminarily held.

Figure 5:
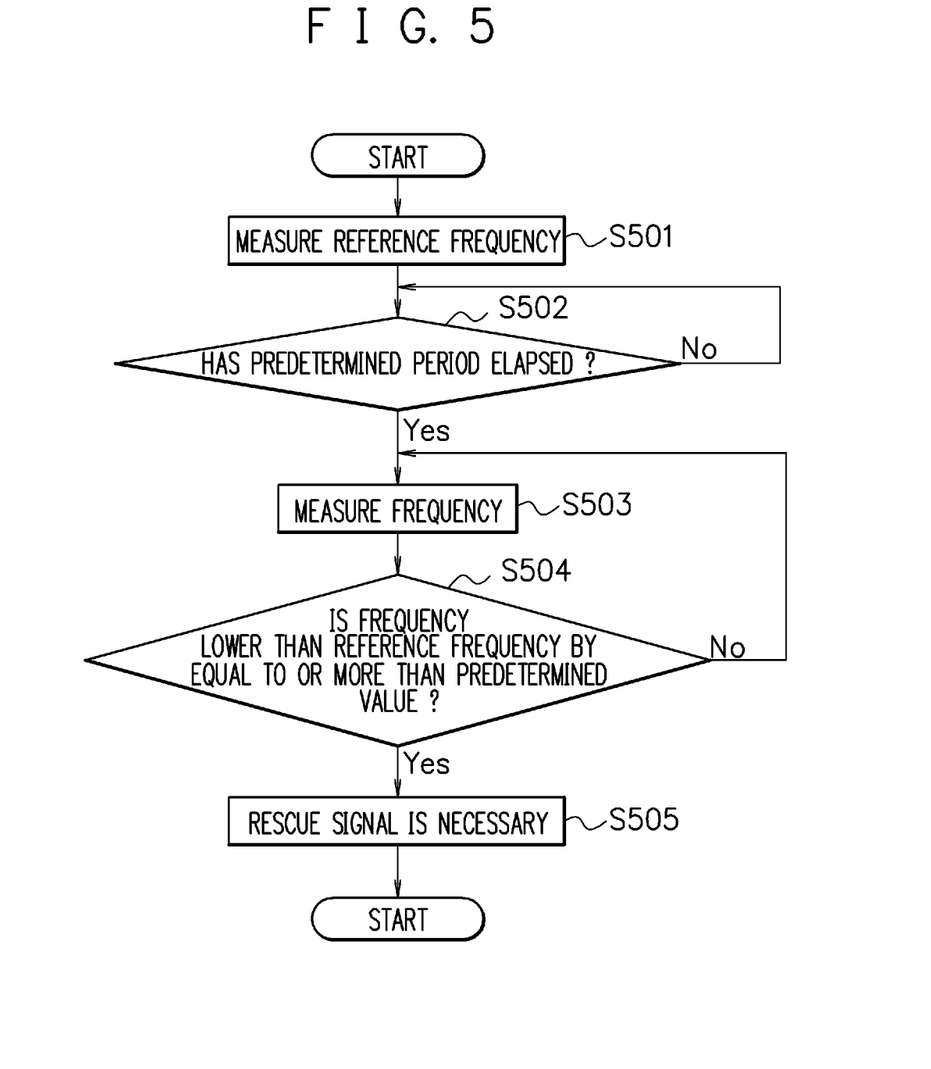
FIG. 5 is a flowchart depicting details of a determination process for a condition C.

FIG. 5 is a flowchart depicting details of the determination process for the condition C. In the flowchart of FIG. 5, it is determined whether or not the rescue signal needs to be transmitted in accordance with a condition regarding a change in frequency of the radio wave of wireless communications performed between the controller 100 and the portable machine 200.

At Step S501, the frequency measuring unit 109 in the control unit 106 measures the frequency of the radio wave of wireless communications between the controller 100 and the portable machine 200 and holds the frequency as the reference frequency.

At Step S502, after stopping the driving source by the lanyard stop switch 2, the control unit 106 stands by until a predetermined period elapses. This process is similar to the process of Step S301 of FIG. 3 that waits the ship 1 to stop.

At Step S503, the frequency measuring unit 109 in the control unit 106 measures the frequency of the radio wave of wireless communications between the controller 100 and the portable machine 200.

At Step S504, the determining unit 110 in the control unit 106 determines whether or not the frequency measured at Step S503 becomes lower than the reference frequency measured at Step S401 by equal to or more than a preset predetermined value. When the frequency does not become low by equal to or more than the predetermined value, the process returns to Step S503 and the frequency is measured again. On the other hand, when the frequency becomes low by equal to or more than the predetermined value, the process proceeds to Step S505 and the transmission of the rescue signal is determined to be necessary.

While the description of FIG. 4 describes that the passenger 4 who has fallen overboard frequently approaches and is away from the ship 1, depending on the situation, the passenger 4 who has fallen overboard is possibly rapidly swept away. With the condition C, the rapid decrease in frequency is determined that the passenger 4 who has fallen overboard is rapidly swept away and is away from the ship 1, and therefore the rescue signal is promptly transmitted.

While Step S501 gives the example where the frequency immediately after the lanyard stop switch 2 operates is measured and set as the reference frequency, in a case where a frequency of a radio wave of wireless communications performed in a state where the controller 100 and the portable machine 200 do not relatively move is already known, the frequency may be set as the reference frequency and preliminarily held.

Figure 6:
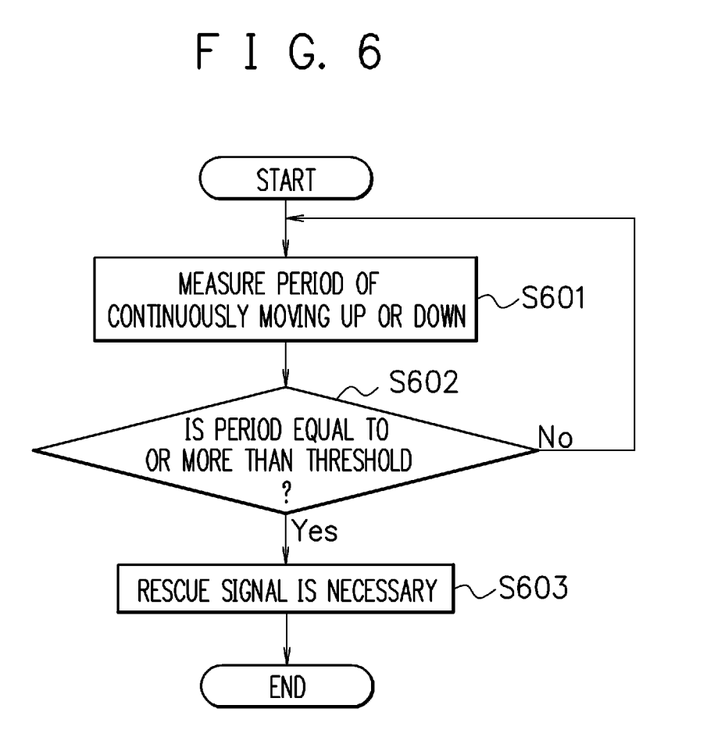
FIG. 6 is a flowchart depicting details of a determination process for a condition D.

FIG. 6 is a flowchart depicting details of the determination process for the condition D. In the flowchart of FIG. 6, it is determined whether or not the rescue signal needs to be transmitted in accordance with a condition regarding a detected value by the acceleration sensor 3 disposed in the ship 1.

At Step S601, the vertical motion period measuring unit 107 in the control unit 106 measures a period during which the ship 1 continuously moves up or down based on the detected value by the acceleration sensor 3 (a magnitude and a direction of acceleration) and a period measured by a clock function that the controller 100 has.

At Step S602, the determining unit 110 in the control unit 106 determines whether or not the period during which the ship 1 continuously moves up or down measured at Step S601 is equal to or more than a preset threshold. When the period during which the ship 1 continuously moves up or down falls below the threshold, the transmission of the rescue signal is determined to be unnecessary currently and the process returns to Step S601. On the other hand, when the period during which the ship 1 continuously moves up or down is equal to or more than the threshold, the process proceeds to Step S603 and the transmission of the rescue signal is determined to be necessary.

From the long period during which the ship 1 moves up and the long period during which the ship 1 moves down, the wave is estimated as heavy due to stormy weather. When the passenger 4 has fallen overboard in this case, it is expected that the passenger 4 is difficult to return to the ship 1 for himself/herself or with help from a person riding on the identical ship, thereby promptly transmitting the rescue signal.

While the acceleration sensor 3 is disposed in the ship 1, an acceleration sensor may be built into the portable machine 200. In this case, the detected value by the acceleration sensor built into the portable machine 200 only needs to be transmitted to the controller 100 by wireless communications.

With the acceleration sensor built into the portable machine 200, for example, a configuration that detects turnover of the passenger 4 (for example, turnover on a wet deck) based on a lateral acceleration is possible. This configuration is applicable to the transmission of the rescue signal triggered by turnover, in addition to the transmission of the rescue signal triggered by falling of the passenger 4 overboard.

It is assumed that when the passenger 4 falls overboard, after generation of the lateral acceleration, acceleration in the up-down direction is generated by tumble. A configuration that thus focuses on the acceleration generating direction to distinguish turnover with falling overboard is possible.

Although the following omits a flowchart for the condition E, when the wireless communications performed with the portable machine 200 comes to a halt, the controller 100 determines that the rescue signal needs to be transmitted. In this case, when the passenger 4 has fallen overboard, the passenger 4 is possibly away from the ship 1 exceeding a distance in which communications are possible or the passenger 4 possibly has gone underwater. Therefore, the return of the passenger 4 to the ship 1 for himself/herself or with help from a person riding on the identical ship is expected to be difficult and therefore the rescue signal is promptly transmitted.

While this embodiment gives the condition A to the condition E, the combination is merely one example. Only some of the condition A to the condition E may be employed, or all or some condition A to condition E may be combined with another condition.

While this embodiment gives the example in which the controller 100 performs the processes of FIG. 2, the portable machine 200 may perform the processes of FIG. 2. Thus, not only the controller 100 of the ship 1 but also the portable machine 200 can transmit the rescue signal. This allows increasing a possibility that the passenger 4 who has fallen overboard, is away from the ship 1, and drifts is found.

As described above, in addition to the detection that there is a possibility that the passenger 4 has fallen overboard, whether or not the rescue signal needs to be transmitted is determined in accordance with the predetermined condition for estimating the situation of the passenger 4. This allows reducing the transmission of unnecessary rescue signal and promptly transmitting the rescue signal when the passenger has fallen overboard and therefore the rescue is expected to be required.

While the embodiments of the present invention are described in detail with reference to the drawings, the respective embodiments merely describe the concrete examples to embody the present invention. The technical scope of the present invention is not limited to the respective embodiments. The present invention can be variously modified within the scope of not departing from the gist and the modifications are included in the technical scope of the present invention.

While the above-described embodiments describe the configuration in which the controller 100 functions as the control device and the communication device in the present invention, the control device and the communication device may be configured as separate devices that can be mutually communicated.

The present invention ensures reducing transmission of the unnecessary rescue signals and promptly transmitting the rescue signal when the passenger has fallen overboard and the rescue is expected to be required.

What is claimed is:

1. A rescue signal transmission system in a ship, comprising:
    a lanyard stop switch configured to detect a possibility that a passenger has fallen overboard;
    a communication device mounted to the ship;
    a portable machine possessed by the passenger, the portable machine being configured to communicate with the communication device; and
    a processor configured such that when the a lanyard stop switch detects the possibility that the passenger has fallen overboard, the processor determines whether or not a rescue signal needs to be transmitted in accordance with a predetermined condition for estimating a situation of the passenger, the processor being configured such that when the transmission of the rescue signal is determined to be necessary, the processor performs control to transmit the rescue signal, wherein
    the lanyard stop switch is coupled to the passenger via a lanyard cord, and the lanyard stop switch stops a driving source of an outboard motor when the lanyard cord is pulled out,
    the processor is configured to determine whether or not the rescue signal needs to be transmitted in accordance with a condition regarding a change from a first frequency to a second frequency of a radio wave of wireless communications performed between the communication device and the portable machine as the predetermined condition, and
    it is determined that the rescue signal needs to be transmitted when the change in the frequency of the radio wave indicates that the passenger who has fallen overboard is swept away in a direction away from the ship.

2. The rescue signal transmission system according to claim 1, wherein
    the processor is configured such that when wireless communications performed between the communication device and the portable machine come to a halt as the predetermined condition, the processor determines that the rescue signal needs to be transmitted.

3. A rescue signal transmission system in a ship, comprising:
    a lanyard stop switch configured to detect a possibility that a passenger has fallen overboard;
    a communication device mounted to the ship;
    a portable machine possessed by the passenger, the portable machine being configured to communicate with the communication device; and
    a processor configured such that when the lanyard stop switch detects the possibility that the passenger has fallen overboard, the processor determines whether or not a rescue signal needs to be transmitted in accordance with a predetermined condition for estimating a situation of the passenger, the processor being configured such that when the transmission of the rescue signal is determined to be necessary, the processor performs control to transmit the rescue signal, wherein
    the lanyard stop switch is coupled to the passenger via a lanyard cord, and the lanyard stop switch stops a driving source of an outboard motor when the lanyard cord is pulled out,
    the processor is configured to determine whether or not the rescue signal needs to be transmitted in accordance with a condition regarding a detected value by an acceleration sensor disposed in the ship or the portable machine as the predetermined condition, and
    a period during which the ship continuously moves up or down is measured based on the detected value by the acceleration sensor, and the transmission of the rescue signal is determined to be necessary when the period exceeds a threshold and the lanyard stop switch stops the driving source of the outboard motor.

4. The rescue signal transmission system according to claim 3, wherein
    the processor is configured such that when wireless communications performed between the communication device and the portable machine come to a halt as the predetermined condition, the processor determines that the rescue signal needs to be transmitted.

* * * * *